United States Patent [19]

Johnson

[11] Patent Number: 5,723,600
[45] Date of Patent: Mar. 3, 1998

[54] METHOD FOR INCORPORATING CELLULOSE ESTERS INTO CELLULOSE BY IMMERSING CELLULOSE IN AN ACID-DOPE SOLUTION

[75] Inventor: Griffin Ivan Johnson, Kingsport, Tenn.

[73] Assignee: Eastman Chemical Company, Kingsport, Tenn.

[21] Appl. No.: 724,045

[22] Filed: Sep. 23, 1996

Related U.S. Application Data

[60] Provisional application No. 60/013,487 Mar. 15, 1996.
[51] Int. Cl.$^6$ .............................. C08B 16/00; C08B 3/06; C08B 1/02
[52] U.S. Cl. .............................. 536/57; 536/56; 536/63; 536/64; 536/65; 536/69; 536/70; 536/71
[58] Field of Search .............................. 536/57, 58, 63, 536/64, 65, 69, 70, 71

[56] References Cited

U.S. PATENT DOCUMENTS

| | | |
|---|---|---|
| 2,976,205 | 3/1961 | Snead et al. . |
| 2,992,156 | 7/1961 | Schulwitz . |
| 3,057,755 | 10/1962 | Malm et al. . |
| 3,103,462 | 9/1963 | Griggs et al. . |

OTHER PUBLICATIONS

Kirk–Othmer, *Concise Encyclopedia of Chemical Technology*, (1985), p. 327.

*Primary Examiner*—Nathan M. Nutter
*Attorney, Agent, or Firm*—Charles R. Martin; Harry J. Gwinnell

[57] ABSTRACT

A method for treating cellulose with cellulose ester for use in various paper products involves reacting cellulose and an acid anhydride to form a cellulose ester-carboxylic acid solution. Acetic anhydride may be used as the acid anhydride, and a cellulose acetate-acetic acid solution may formed as the resulting cellulose ester-acetic acid solution. The cellulose acetate-acetic acid solution is diluted in a mixer, with additional acetic acid. Bulk cellulose is milled into cellulose fibers, and the diluted cellulose acetate-acetic acid solution diluted is combined with the cellulose fibers to achieve a treated fiber. Excess cellulose acetate-acetic acid solution is removed from the treated fiber and recycled to the mixer used in dilution. The treated fiber is water washed followed by removing water from the washed treated fiber. This product can then be used in paper making to produce a sheet for circuit boards, laminated products, and various paper products.

12 Claims, 2 Drawing Sheets

METHOD FOR INCORPORATING CELLULOSE ESTERS INTO CELLULOSE BY IMMERSING CELLULOSE IN AN ACID-DOPE SOLUTION

This application claims the benefit of the filing date of provisional application Ser. No. 60/013487, filed Mar. 15, 1996.

BACKGROUND OF THE INVENTION

1. Field of the Invention

The present invention relates in general to a method for incorporating cellulose esters into cellulose, and more particularly to a method of immersing cellulose in a cellulose acetate solution.

2. Description of the Related Art

According to Kirk-Othmer, *Concise Encyclopedia of Chemical Technology*, (1985), p. 327, "Cellulose is a long linear polymer of anhydroglucose units and this is reflected in the thread-like structures of cellulose found in plant cell walls (elementary fibrils, approximately 3.5 nm in width and indefinite length) which are further laterally associated to provide strength (as microfibrils, generally 10–30 nm in breadth)." Cellulose is used in a number of common products, including facial and toilet tissue, disposable towels and paper. To improve strength and achieve other improved properties, it has been desired to incorporate cellulose acetate into these products.

The following discussion refers at places specifically to cellulose acetate. However, the discussion relates to other cellulose esters, such as cellulose propionate and cellulose butyrate. Additionally, a combination cellulose ester, such as cellulose acetate-butyrate in which one cellulose chain has acetyl and butyryl substitution, may be used. Further, a mixture of cellulose esters is possible.

Each anhydroglucose unit in a cellulose chain has three hydroxyl groups where ester substitution (such as acetate substitution) may occur. Cellulose esters may be formed by reacting cellulose and an acid anhydride yielding a carboxylic acid and a cellulose ester. The number of carbon atoms in the ester substituent is the same as the number of carbon atoms in the carboxylic acid and is one half the number of carbon atoms in the acid anhydride. This of course assumes that the acid anhydride is symmetrical, having the following form:

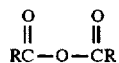

Cellulose acetate-butyrate results from a reaction of cellulose, acetic anhydride and butyric anhydride.

Cellulose acetate is conventionally manufactured by a method shown schematically in FIG. 1. Cellulose pulp 2, derived from wood or cotton fibers, is supplied to a reactor 4. Acetic anhydride and acetic acid are also supplied to the reactor 4, from feed 6. Also present in reactor 4 is an acid catalyst, such as sulfuric acid. The cellulose and acetic anhydride are converted to cellulose acetate and acetic acid which leave reactor 4 in what is known as an "acid dope" 8. The acid dope may have a 20 wt. % to cellulose acetate concentration. The acid dope 8 is fed to a processing step 10. However, before going to the processing step 10, it is possible that the acid dope will be partially hydrolyzed to achieve the desired degree of ester substitution of the cellulose molecule. That is, after reaction in reactor 4, the cellulose molecule may be acylated such that all three hydroxyl groups have been acylated to replace the hydroxyl with an acetate. The cellulose molecule is said to be completely acetylated. To convert a portion of the acetyl groups back to hydroxyl groups, the acid dope may be placed in a reactor with the acid catalyst present and water to convert some of the acetyl groups back to hydroxy groups. As a result of partial hydrolysis, the degree of substitution may be 2.40 to 2.60. In the partial hydrolysis, the water also converts the remaining acetic anhydride to acetic acid. After partial hydrolysis operation, the acid catalyst may be neutralized in a separate reactor with a base. Because the acid catalyst is a strong acid such as sulfuric acid, the base used in neutralization will react preferentially with the acid catalyst without reacting with the acetic acid.

In the processing step 10, water is mixed with the acid dope to precipitate the cellulose acetate out of the acetic acid solution. A solution of water and 30 wt. % acetic acid 12 is fed to a concentrator 14, where the water is separated form the acetic acid, and then the acetic acid is recycled back to reactor 4 where the acetic acid serves as a solvent for the cellulose acetate. The cellulose acetate that is washed and dried in the processing step 10 is then dissolved in another solvent 16 in vessel 18. The other solvent 16 may be acetone. Then, the dissolved cellulose acetate 20 is fed to a spinnerette 22 which removes the solvent and forms a fiber. In paper applications, this acetate fiber could be mixed with cellulose to make paper.

The cellulose acetate achieved from the method shown schematically in FIG. 1 may be combined with cellulose to make paper.

The method shown schematically in FIG. 1 is relatively expensive to perform. To eliminate several of the production steps, it has been proposed to use the cellulose acetate directly after the hydrolysis step. This avoids several expense of process steps, but the process is still expensive.

When the cellulose acetate is combined with cellulose to make paper, the concentration of cellulose acetate must be maintained rather high to ensure that there is a good distribution in the cellulose. This too has resulted in added expense to the product, in this case, paper.

SUMMARY OF THE INVENTION

Accordingly, it is an object of the present invention to reduce the processing steps necessary before cellulose acetate can be combined with cellulose.

It is a further object of the present invention to achieve a cellulose-cellulose acetate product having a lower concentration of cellulose acetate.

These and other objects are accomplished by method for producing cellulose containing a cellulose ester in which a cellulose ester-carboxylic acid solution (acid dope) is combined with a low vapor pressure solvent having a boiling point above 75° C. to achieve a mixed product. The ester substituent in the cellulose ester and the carboxylic acid have the same number of carbon atoms. The cellulose ester-acetic acid solution may be a cellulose acetate-acetic acid solution. The mixed product is then combined with cellulose, and water washing is performed to recover the carboxylic acid.

BRIEF DESCRIPTION OF THE DRAWINGS

The invention will now be explained in more detail in connected with the aid of the attached drawings in which like reference numerals represents like elements, wherein.

DETAILED DESCRIPTION OF THE PREFERRED EMBODIMENTS

Figure 1:
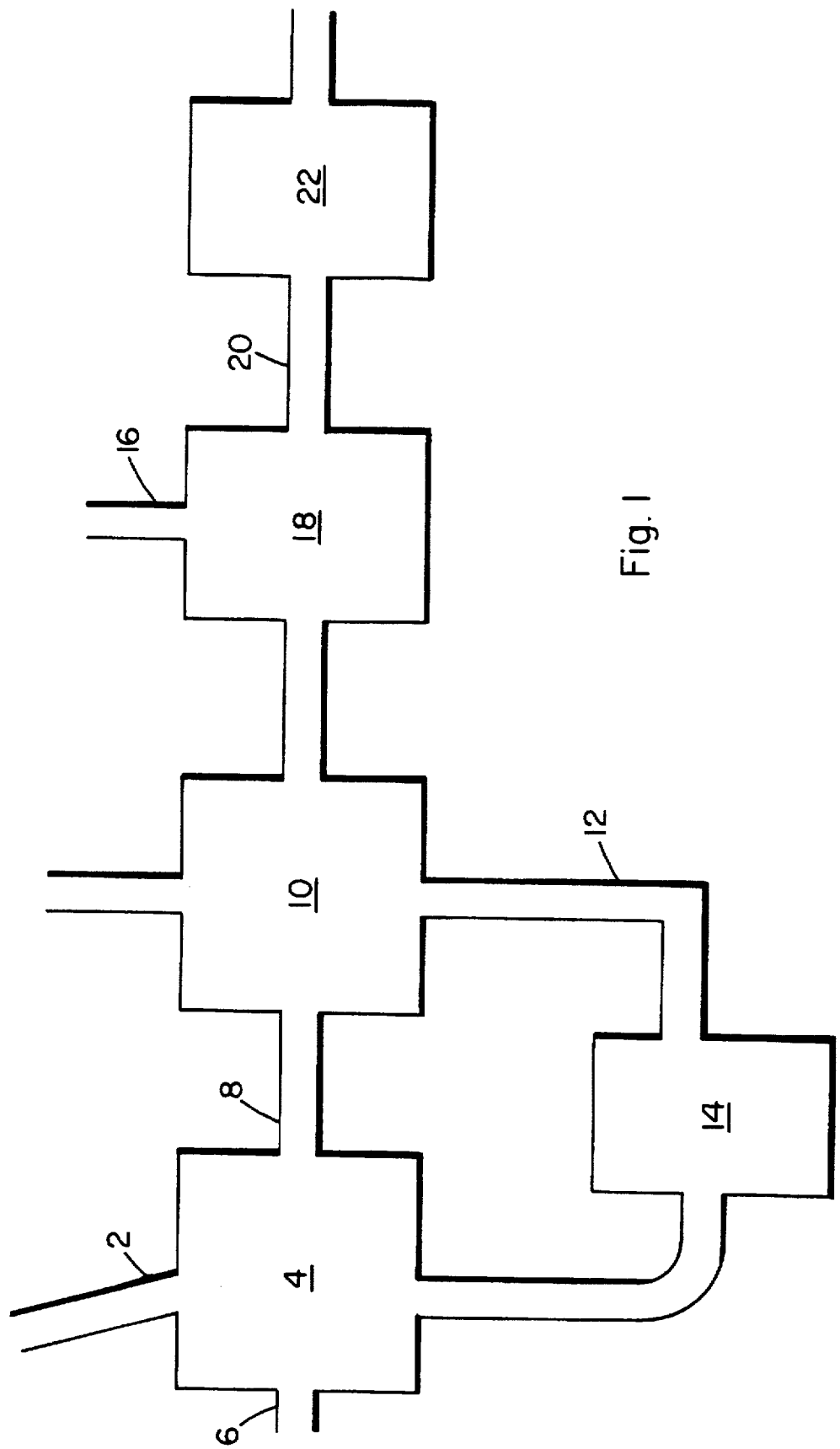
FIG. 1 is a diagram schematically representing a method of the related art.
Figure 2:
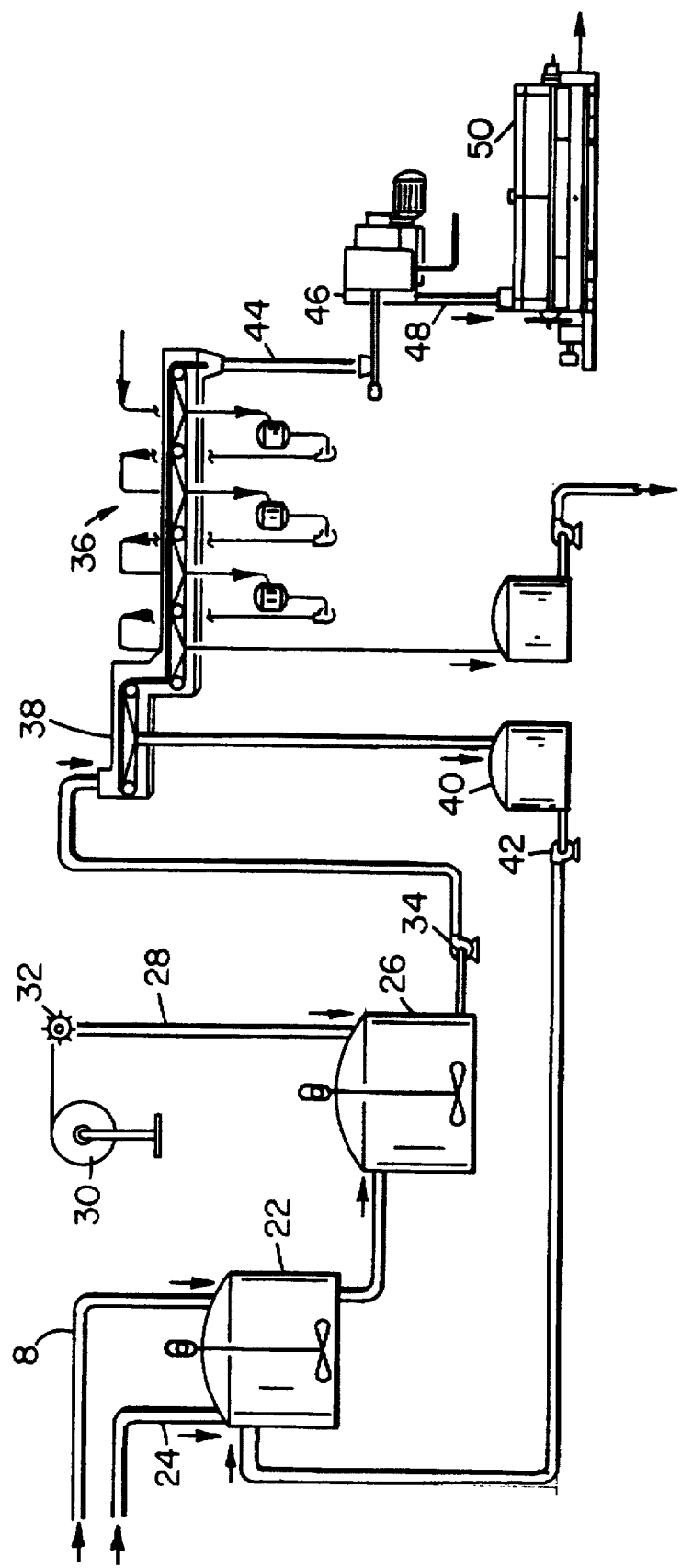
FIG. 2 is a diagram schematically representing a method according to the present invention.

Referring to FIG. 2, a cellulose ester-carboxylic acid solution (acid dope) 8 is fed to a first mixer 22. The acid dope 8 may be the same acid dope produced in the reactor 4 discussed above, and may have a 20 wt. % cellulose acetate concentration. That is, the acid dope 8 can be used directly without neutralization of the acid catalyst and without washing and drying in processing step 10. However, the cellulose acetate may be partially hydrolyzed to a degree of substitution of 2.40 to 2.60. More highly acylated cellulose acetate can also be used. Mixer 22 mixes the acid dope solution 8 with a solvent having a lower vapor pressure from feed 24 to achieve a "diluted dope" feed 25. The low vapor pressure solvent should have a boiling point above 75° C., more preferably above 95° C., and most preferably above 115° C. Acetic acid may be used as the low vapor pressure solvent. The acetic acid supplied to mixer 22 may be a 75 wt. % percent acetic acid solution in water. The diluted dope 25 is fed from first mixer 22 to a second mixer 26. Fluffed pulp 28 is also fed to the second mixer 26. The fluffed pulp may come from a pulp sheet roll 30, which is fed through a hammer mill 32. The pulp sheet roll 30 is a conventional roll such as that produced in paper making. Although chemical grade pulp sheets are to produce cellulose acetate, this more expensive cellulose should not be necessary. The hammer mill 32 chops up the sheet to make individual fibers. Other similar equipment beside the hammer mill may also be used.

In the second mixer 26, cellulose acetate is coated on the cellulose of the fluffed pulp. The temperature in the second mixer 26 is not critical, and may be between about 100° F. and 200° F., and preferably between 130° F. and 150° F. The time during which the cellulose is in contact with the diluted dope is determined in the continuous process shown based on the volume of the second mixer 26 and the flow rate into and out of the second mixer 26. The contact time is also not critical. In general, sufficient time must be allowed for the diluted dope to thoroughly wet the cellulose fibers. Contact times of from 2 minutes to about 10 minutes will generally be sufficient, although longer times may be used if desired.

From the second mixer 26, pump 34 pumps the contents of the second mixer 26 to a belt filter 36. In the initial portion 38 of belt filter 36 diluted doped is filtered off to a dope tank 40 from which pump 42 recycles the diluted dope back to the first mixer 22.

With the diluted dope being recycled, it is very easy to control the amount of cellulose ester impregnated into the cellulose. For example, if acid dope 8 is fed at a rate of 5 pounds per minute and contains 20 wt. % ester, then 1 pound per minute cellulose ester is being fed to the process. If the cellulose sheet from pulp sheet roll 30 is being supplied at a rate of 100 pounds per minute, then the resulting cellulose acetate content in the cellulose will be 1 weight percent. This is because the only place for the cellulose and cellulose acetate to leave the process is in the final product. Thus, controlling the process is a simple procedure.

After the initial portion 38 of belt filter 36, the impregnated cellulose undergoes a counter current water wash. That is, water is fed in one end through the material about to exit the belt filter 36. Then, the water containing some acetic acid is pumped to upstream portions of the belt until most of the acetic acid is removed. A four stage counter current wash is shown. From the last stage of the washing, the acetic acid solution leaving belt filter 36 may have a 30 wt. % acetic acid concentration. It is preferable that the concentration of acetic acid be sufficient enough so that an acid concentration process is economically feasible. It should be noted that because the solvent (acetic acid) has a low vapor pressure, it cannot easily be removed completely by an evaporation or boiling process.

Washed ester coated cellulose 44, which may be 15–20 wt. % solids, is supplied from the belt filter 36 to a centrifuge 46. The centrifuge 46 removes some of the liquid added in the washing. Although a centrifuge 46 is shown, any piece of equipment, such as a press, which de-waters may be used. This type of equipment is conventionally used in the paper industry.

From centrifuge 46, the de-watered ester coated cellulose 48 may be fed to a dryer 50. For efficiency, the de-watered cellulose 48 fed to dryer 50 should have moisture content of no more than 50 wt. %. The dried cellulose ("treated fiber") can then be subjected to further processing to make circuit boards, laminated products and various paper products. To make paper products, the treated fiber may be combined with untreated cellulose.

As an alternative to the above process, instead of using hammer mill 32 to break-up the pulp sheet, it is conceivable that the diluted dope can be supplied directly to the pulp sheet. In this case, the moisture content after washing may be 50 wt. %, and a centrifuge would not be necessary before drying.

In some instances, it may be desired to use wet ester coated cellulose directly in further processing. If this is desired, the cellulose from belt filter 36 may be shipped directly or the de-watered ester coated cellulose 48 from centrifuge 46 may be shipped.

The concentration of cellulose acetate in the acid dope 8 is not critical, but will depend on some extent upon the desired degree of penetration into of the cellulose microfibrils by the cellulose acetate. In general, the concentration of cellulose acetate in the acid dope 8 should be between 0.5 wt. % and 25 wt. %. Dopes which are too concentrated will result in the excess dope being difficult to remove from the cellulose, particularly at lower temperatures.

EXAMPLES

Example 1

An acid dope was diluted with acetic acid and then heated to 140° F. Finely divided cellulose, prepared by disintegrating a commercial cellulose pulp sheet, was stirred into the diluted dope. The ratio of diluted dope to cellulose was 17:1 in all cases, but the dope dilution (acetic acid to acid dope) was varied. While maintaining the mixture at 140° F., it was stirred for approximately five minutes, then filtered with a vacuum using Buchner filter to remove as much dope as possible. The residue was washed with hot water until it no longer smelled of acetic acid. Then, the residue was filtered and dried. The percentage of cellulose acetate in the treated fiber (cellulose coated/impregnated with cellulose acetate) was determined based on the dry weight of cellulose before and after impregnation with cellulose acetate. The results are shown in the following table. As can be seen, as the doped dilution decreased, the percentage of cellulose acetate in the product treated fiber decreased with increased dope dilution.

| Experiment | Dope Dilution | Wt. % Cellulose Acetate In Treated Fiber |
|---|---|---|
| 1 | 29:1 | 1.0% |
| 2 | 15:1 | 1.0% |
| 3 | 7:1 | 3.5% |
| 4 | 3:1 | 5.2% |
| 5 | 1:1 | 50.0% |

Example 2

The procedure of Example 1 was followed using Weyerhaeuser pulp broken into individual fibers using a hammer mill which had been set to its highest speed setting and slowest cellulose feed to breakup the fibers as much as possible. The acid dope used was taken from cellulose acetate production at the stage at which neutralization of the acid hydrolysis catalyst had been completed. The acid dope was diluted with 75 wt. % acetic acid, and the ratio of acid dope to acetic acid was varied as will be discussed in connection with below table. The ratio of diluted dope to cellulose was 17:1 in all cases.

The diluted dope was placed in a constant temperature bath. After the temperature stabilized, 40 grams of fluffed cellulose pulp was added. The mixture was stirred for approximately 2 minutes, then filtered on a Buchner funnel to remove as much excess dope as possible. Then, the residue was pressed with a rubber dam. The weight of the recovered diluted dope was recorded, and the residue was washed on the Buchner funnel with hot water without applying a vacuum for 10 minutes. Then, applying a vacuum, the residue was further washed until there was no residual odor of acetic acid. The pulp was finally washed with 200 mL of deionized water, sucked as dry as possible, and dried in an oven overnight. The below table shows the dope dilution, that is, the ratio of acid dope to acetic acid. The below table further shows the temperature in the constant temperature bath and the weight of the dry product. The percentage of cellulose acetate in the treated fiber was calculated by subtracting the original weight of the fibers (40 g) from the weight of the treated fiber.

| Sample | Dope Dilution | Temperature °F. | Wt. Dry Product g | Wt. % Cellulose Acetate in Treated Fiber |
|---|---|---|---|---|
| 1 | 1:1 | 140 | 64.3 | 38 |
| 2 | 1.5:1 | 140 | 50.8 | 21 |
| 3 | 2:1 | 140 | 45.8 | 13 |
| 4 | 1:1 | 130 | 66.8 | 40 |
| 5 | 1.5:1 | 130 | 48.3 | 17 |

Example 3

5 wt. % cellulose acetate treated fiber, prepared as described in the preceding examples, was mixed with 95 wt. % untreated cellulose and cast into paper sheets in a traditional paper making process. The percentage of cellulose acetate in the treated fiber was varied. The below table reflects the percentage of cellulose acetate in the treated fiber, not the percentage of cellulose acetate in the resulting sheets, which would be about 5% of the values in the table. The break-point tensile strength was determined, and is also shown in the below table. It is somewhat remarkable that the paper made from treated fiber having a 1 wt. % cellulose acetate concentration exhibits a substantial increase in tensile strength. This increase the strength of paper at very low levels of cellulose acetate.

| Sample | Wt. % Acetate in Treated Fiber | Tensile Strength |
|---|---|---|
| 1 | 0 | 5286 |
| 2 | 0 | 5437 |
| 3 | 0.3 | 6861 |
| 4 | 0.5 | 5230 |
| 5 | 0.8 | 6158 |
| 6 | 1 | 6451 |
| 7 | 1.2 | 7012 |
| 8 | 3.5 | 6096 |
| 9 | 5.2 | 5821 |
| 10 | 5.6 | 5936 |
| 11 | 50.0 | 5961 |
| 12 | 50.0 | 5868 |

While the invention has been described in connection with preferred embodiments, it will be understood that modifications thereof within the principles outlined above will be evident to those skilled in the art. Thus, the invention is not limited to the preferred embodiments, but is intended to encompass such modifications.

What is claimed is:

1. A method of incorporating a cellulose ester into cellulose, comprising the steps of:
    (a) combining a cellulose ester-carboxylic acid solution with cellulose to achieve a treated fiber, the ester substituent in the cellulose ester and the carboxylic acid having the same number of carbon atoms; and
    (b) water washing the treated fiber to recover the carboxylic acid.

2. A method according to claim 1, wherein the cellulose ester is cellulose acetate and the carboxylic acid is acetic acid.

3. A method according to claim 2, further comprising the step of combining cellulose and acetic anhydride to form the cellulose acetate-acetic acid solution.

4. A method according to claim 3, wherein after the cellulose is combined with acetic anhydride and before the cellulose acetate-acetic acid solution is combined with cellulose in step (a), the cellulose acetate in the cellulose acetate-acetic acid solution is partially hydrolyzed to achieve a desired degree of ester substitution.

5. A method according to claim 1, wherein the water washing in step (b) is performed with a counter-current belt washer.

6. A method according to claim 1, further comprising the step of (c) removing water from the treated fiber washed in step (b).

7. A method according to claim 1, further comprising the step of (c) milling bulk cellulose into cellulose fibers to be used as the cellulose combined with the cellulose ester-carboxylic acid solution in step (a).

8. A method according to claim 1, further comprising the steps of:
    (c) combining the treated fiber washed in step (b) with additional cellulose to achieve a paper material; and
    (d) using the paper material in a paper making process.

9. A method of incorporating cellulose acetate into cellulose, comprising the steps of:
    (a) combining a cellulose ester-carboxylic acid solution with a solvent having a boiling point above 75° C. to achieve a mixed product, the ester substituent in the cellulose ester and the carboxylic acid having the same number of carbon atoms; and (b) combining cellulose with the mixed product.

10. A method according to claim 9, wherein the solvent has a boiling point above about 95° C.

11. A method according to claim 9, wherein the solvent has a boiling point above about 115° C.

12. A method of incorporating cellulose acetate into cellulose, comprising the steps of:
   (a) combining cellulose and acetic anhydride to form a cellulose acetate-acetic acid solution;
   (b) diluting the cellulose acetate-acetic acid solution in a mixer, with additional acetic acid and water;
   (c) milling bulk cellulose into cellulose fibers;
   (d) combining the cellulose acetate-acetic acid solution diluted in step (b) with the cellulose fibers to achieve a treated fiber;
   (e) removing excess cellulose acetate-acetic acid solution from the treated fiber;
   (f) adding the cellulose acetate-acetic acid solution removed in step (e) to the mixer used in step (b);
   (g) water washing the treated fiber; and
   (h) removing water from the treated fiber washed in step (g).

* * * * *